United States Patent
Knight

[19]

[11] Patent Number: 6,126,330
[45] Date of Patent: Oct. 3, 2000

[54] RUN-TIME INSTRUMENTATION FOR OBJECT ORIENTED PROGRAMMED APPLICATIONS

[75] Inventor: Christine Nancy Knight, Toronto, Canada

[73] Assignee: International Business Machines Corporation, Armonk, N.Y.

[21] Appl. No.: 09/070,484

[22] Filed: Apr. 30, 1998

[51] Int. Cl.[7] .................................................. G06F 9/445
[52] U.S. Cl. .......................... 395/704; 395/701; 395/702; 395/703; 395/704; 395/705; 395/706
[58] Field of Search ................................... 395/704, 703, 395/705

[56] References Cited

U.S. PATENT DOCUMENTS

| | | | |
|---|---|---|---|
| 5,313,616 | 5/1994 | Cline et al. . | |
| 5,465,258 | 11/1995 | Adams . | |
| 5,581,695 | 12/1996 | Robin et al. | 714/28 |
| 5,581,696 | 12/1996 | Kolawa et al. . | |
| 5,758,061 | 5/1998 | Plum | 395/183.11 |
| 5,832,270 | 11/1998 | Laffra et al. | 395/703 |
| 5,870,607 | 2/1999 | Netzer | 395/704 |

OTHER PUBLICATIONS

Chow et al., "Compile–Time analysis of paralled programs that share memory", ACM, pp. 130–141. Jan. 1992.
Hamlet et al., Exploring Dataflow testing Arrays, IEEE, pp. 118–129, 1993.

*Primary Examiner*—Tariq R. Hafiz
*Assistant Examiner*—Ted T. Vo
*Attorney, Agent, or Firm*—Scully, Scott, Murphy & Presser; Jay P. Sbrollini, Esq.

[57] ABSTRACT

It is desirable for software developers to be able to conveniently obtain feedback from users of applications. It is known for developers and others to use code instrumentation for gathering various types of data relating to applications and their uses. The use of compile time instrumentation may be practical for some situations but it has significant drawbacks when used to provide indications of user interaction with applications. The present invention relates to the use of run time instrumentation for providing feedback from users of object oriented applications where the applications have unique object identifiers and support dynamic data exchange. The invention utilizes a setup software tool to create a monitor input file which indicates which objects of the application should be monitored when a user interacts with them.

15 Claims, 2 Drawing Sheets

RUN-TIME INSTRUMENTATION FOR OBJECT ORIENTED PROGRAMMED APPLICATIONS

BACKGROUND OF THE INVENTION

1. Technical Field

This invention relates generally to computer software applications, and more particularly to instrumenting object oriented programmed applications. The invention more specifically relates to instrumenting object oriented program applications to provide application-related information consisting of indications of end user interactions with the applications and how the end user makes use of the applications.

2. Prior Art

It is common experience that most users of computing applications encounter various sorts of problems and inconsistencies while using the applications. Designing computer software that will minimize user problems requires knowledge as to how the user is making use of the application and the tasks that are trying to be accomplished by use of the applications. The design process typically includes iterative design and user testing of those designs in order to identify where users have problems so that design flaws can be accurately addressed and fixed. A thorough knowledge of problems that users encounter in existing products is also critical if design mistakes are to be avoided for future versions of those applications.

Understanding what is important to users of a particular software application product has always been a challenge for software application developers. Typically, enhancements to a product release are based on feedback from surveys, forums or from user design centre sessions in which participants are given a set of tasks to accomplish while using the application. Some problems inherent in these methods, however, include the inability of users to articulate their needs, the artificiality of surveys produces feedback which is not meaningful, and users of forums are typically technical fans of the product so that the results may be of little practical use to the product developers.

Most would agree that the best way to get feedback is by observing what a user does throughout actual use sessions with the product, that is by watching the user as the user works through the application in the setting for which it was intended. The problem is to provide a meaningful solution for gathering real user feedback in real time on a regular basis, and providing this data back to the program developer where it can be analyzed and used in enhancing and improving the application. One effective way of gathering such information about user interaction with the application is through code instrumentation. The term "instrumentation" is understood to mean the incorporation of statements or routines in an application to cause outputs to be provided when the application is running on a computer system thereby illustrating the interaction of the end user with the application.

Currently, it is known that instrumenting an application, including an object oriented programmed application, involves going into the application and adding appropriate program code at every point in the application where useful user data can be gathered, and then recompiling the application. It has been found that this "compile-time" method of instrumentation is not really effective for a number of reasons. It takes many points of instrumentation to get sufficient and meaningful overall coverage of user interaction with the application. At the particular code level, it is difficult to be judicious in selecting code points for instrumentation. A large number of instrumentation points can negatively affect the application's performance. The amount of data produced depends entirely on where the user is spending time in working with the application. In some instances, the data can be large and therefore cumbersome to analyze, and at other times, it may be sparse and therefore of very little practical use.

Any fine tuning of the instrumentation to adjust for the aforementioned negative results involves farther coding and re-compiling of the application. In addition, a revised application may have to be delivered to the end user. Probably the most significant obstacle to the effectiveness of this known method is that instrumenting application code requires a programmer who has expert knowledge of that code. Such a person typically is rarely involved in user feedback activities. There is no previously known solution to readily overcome the aforementioned inherent problems with "compile-time" instrumentation of a program application. The "run-time" instrumentation to be subsequently described herein to obtain feedback from users of applications has not been previously suggested.

The most general example of "compile-time" instrumentation is simply where source code statements or routines are added to a source code version of a software application, and then the revised application is compiled.

It is a known software development technique that tracing information resulting from the use of compile-time instrumentation is sometimes used by developers to "debug" programs to provide state information of running applications. However, this necessitates the recompiling of the application with each addition of instrumentation code.

As an example of instrumentation of a program, reference is made to U.S. Pat. No. 5,313,616 which issued May 17, 1994 to 88Open Consortium Ltd., entitled "Method for Analyzing Calls of Application Program by Inserting Monitoring Routines into the Executable Version and Redirecting Calls to the Monitoring Routines". This reference relates to testing applications resulting from process-based programming technology to determine the application's conformance with some standard or set of operating system rules. The method entails that all possible instrumentation points are located in the application and monitor code is inserted at each point in order to be able to carry out a dynamic analysis of the application. The monitor code is added to the binary version of the application and thus the application is changed after it has been compiled and linked.

Other methods and systems which make use of instrumentation techniques are known for evaluating and testing the performance of computer programs. These are generally referred to as software evaluation tools. One such representative system is described in U.S. Pat. No. 5,465,258, entitled "Binary Image Performance Evaluation Tool" which issued to Integrity Systems, Inc. on Nov. 7, 1995. This patent relates to evaluating the performance of a particular computer program on a particular computer by processing an executable version of the program and an architecture description file of the computer resulting in an instrumented image of the program code. Execution of the instrumented image results performance information being collected for subsequent analysis and assessment.

Another representative evaluation system is described in U.S. Pat. No. 5,581,696 entitled "Method Using a Computer for Automatically Debugging" which issued Dec. 3, 1996 to Parasoft Corp. This specification provides for the automatic instrumenting of a computer program with debug routines for dynamic debugging. By processing a source program file and a programming language definition file an executable program file is obtained which contains the instrumented program. The teachings of this reference may be considered to be compile-time instrumentation.

SUMMARY OF THE INVENTION

It is therefore an object of the present invention to provide a new approach to the instrumenting of object oriented programmed applications.

It is a further object of the invention to provide a new approach to the instrumenting of program applications resulting in indications of user interactions with the application and in particular, object oriented programmed applications, wherein this approach can eliminate or at least reduce the aforementioned difficulties inherent with known compile-time methods of instrumentation.

A further object of the invention is to provide "time" code instrumentation for object oriented programmed applications for providing feedback of user interaction with an application.

A further object of the invention is to provide for "run-time" instrumentation for an application such that the instrumentation can be readily changed as various feedback on user interactions with the application is needed.

According to one aspect of the invention, there is provided a computer implemented method for providing run-time instrumentation for an object oriented programmed computer application where said application has object identifiers and supports dynamic data exchange. The method comprises the steps of concurrently running said application on a computer system with a set-up program which also supports dynamic data exchange, logging and displaying object identifiers in the set-up program resulting from user interaction with objects in said application, selecting object identifiers from those logged and displayed, creating a monitor input file based on the said selected object identifiers, and using said monitor input file to provide run-time instrumentation for said application when said application and monitor input file are subsequently used on a computer system.

According to a further aspect of the invention, there is provided a computer implemented method for providing an output containing details of user interaction with an object oriented programmed computer application running on a computer system in which said programmed application includes object identifiers, a monitor class of objects and a monitor input file which includes object identifiers selected from those object identifiers contained in said application. The method comprises the steps of executing said application on the computer system which involves interaction of an end-user wish said application, creating an instance of a monitor object by the execution of said application, processing the monitor input file in the computer system by said instance of a monitor object, and providing an output from the computer system representing details of user interaction with said application.

According to a further aspect of the invention there is provided a computer program product comprising a computer usable medium having computer readable program code means therein for providing details of user interaction with an object oriented programmed computer application running on a computer system in which said programmed application includes object identifiers, a monitor class of objects and a monitor input file which includes object identifiers selected from those object identifiers contained in said application. The computer readable program code means in said computer program product comprises computer readable program code means for causing the computer to execute said application and which involves interaction of an end-user with said application, computer readable program code means for causing the computer to create an instance of a monitor object by the execution of said application, computer readable program code means for causing the computer to process the monitor input file by said instance of a monitor object, and computer readable program code means for causing the computer to provide an output representing details of user interaction with said application.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
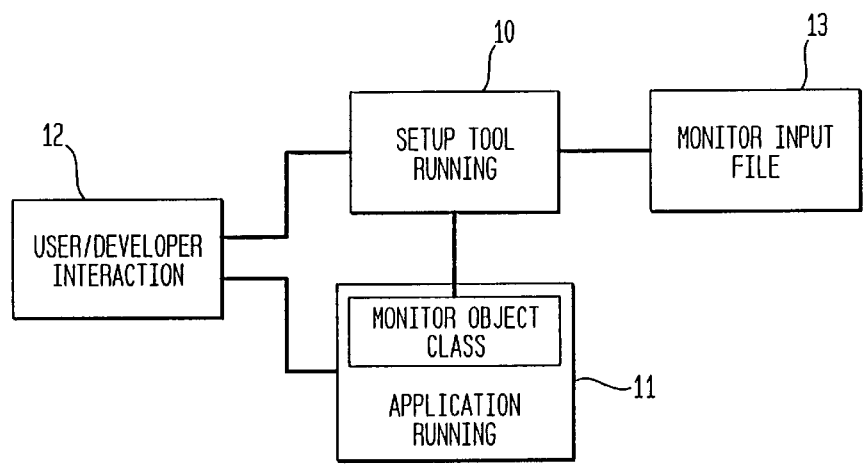
FIG. 1 is an illustration of creating a monitor input file.

The present invention relates particularly to object oriented technology. Object oriented computer programming technology is significantly different from conventional process based technology. While both technologies can be used to solve the same problem, the ultimate solutions to the problem may be quite different. The design focus of object oriented design is on how the problem can be broken down into a set of autonomous entities that can work together to provide a solution. The autonomous entities of object oriented technology are called "objects". An object is a data structure and a set of operations or functions also referred to as methods, that can access that data structure. An interface associated with each object defines the way in which methods operate on their associated object. Objects having similar characteristics and common behaviour can be grouped together into a class. Each defined object will usually be manifested in a number of instances. Each instance contains the particular data structure for a particular example of the object. The relationship between classes, objects and instances are established during build time or generation of the object oriented computer environment, ie. prior to run-time or execution of the object oriented computing environment. Examples of common object oriented technology programming languages are C++ and SmallTalk. For further details and a description of object oriented technology and the development of programs, reference is made to the textbook "Object-Oriented Analysis and Design with Applications", Second Edition, Grady Booch, published by The Benjamin/Cummings Publishing Company, Inc.

The applications that have been selected to illustrate the subject invention in this specification is the VisualAge® C++ suite of products available from International Business Machines Corporation, which includes IBM VisualAge for C++ for Windows, IBM VisualAge C++ for OS/2, and IBM VisualAge C++ for OS/400 programs.

The VisualAge C++ family of products is based on object oriented technology and provides construction from parts for the development of object oriented applications. These products are usable across a range of computer platforms and operating systems including personal computers using OS/2 operating system provided by IBM Corporation, and host computer systems such as the AS/400 system using the OS/400 operating system, also available from IBM Corporation. VisualAge C++ products have a number of features. Each product includes an Open Class library which is a comprehensive set of C++ classes of application building blocks. The Open Class library contains hundreds of pre-defined and pre-tested building blocks along with thousands of methods or functions, making development of object oriented applications faster, easier and less error-prone.

A key relationship between objects in object oriented programmed applications is the "notifier"/"observer" relationship. A "notifier" object may have any number of dependent "observer" objects with which they can be associated. The "observer" object is notified by the "notifier" object when certain events occur on that object. Thus a subject object acts as a "notifier" object and sends updates of its status to an "observer" object. Further understanding of "observer" objects may be obtained with reference to the textbook "Design Patterns, Elements of Reusable Object-Oriented Software", by E. Gamma, R. Helm, R. Johnson and J. Vlissides, published by Addison-Wesley Publishing Company.

Many classes of objects in the Open Class library, such as IWindow, which also acts as a "notifier" object, and IObserver, can be assigned persistent and unique identifiers. A Monitor object class is a sub-class of the "observer" object class. Within the naming conventions used by IBM for the VisualAge C++ suite of products, all "window" objects act as "notifier" objects, and thus the "window" sub-class is an inherited sub-class of the "notifier" object class. The convention further identifies "window" objects and "observer" objects by the names IWindow and IObserver, respectively.

VisualAge C++ products also support dynamic data exchange (DDE). This is a term known in computer programming and refers to the dynamic exchange of data between two or more processes running simultaneously on the same computer system.

To commence the instrumentation process of the subject invention, a setup tool is used to create the file which will be used at run-time to determine the points of instrumentation in the application. This created file, referred to herein as the monitor input file, is included as part of the application provided to end users so that the use by anyone knowing how to use the application will result in user interaction data being collected and provided.

As illustrated in FIG. 1 of the drawings, components of the Open Class library and functions provided in the VisualAge C++ products are used by the user/developer, generally shown by numeral 12, during the setup phase to create a monitor input file 13. The setup tool 10 runs in its own process concurrent with the running of application 11 under consideration. The developer interacts with both the setup tool 10 and application 11 in order to create an output of a meaningful monitor input file 13 for the application. This output will facilitate the instrumentation of the application at run-time and the collection of user interaction data. In view of the relative ease with which monitor input file 13 can be created for instrumentation of the application, it can be readily changed by the developer as may be subsequently required.

Figure 2:
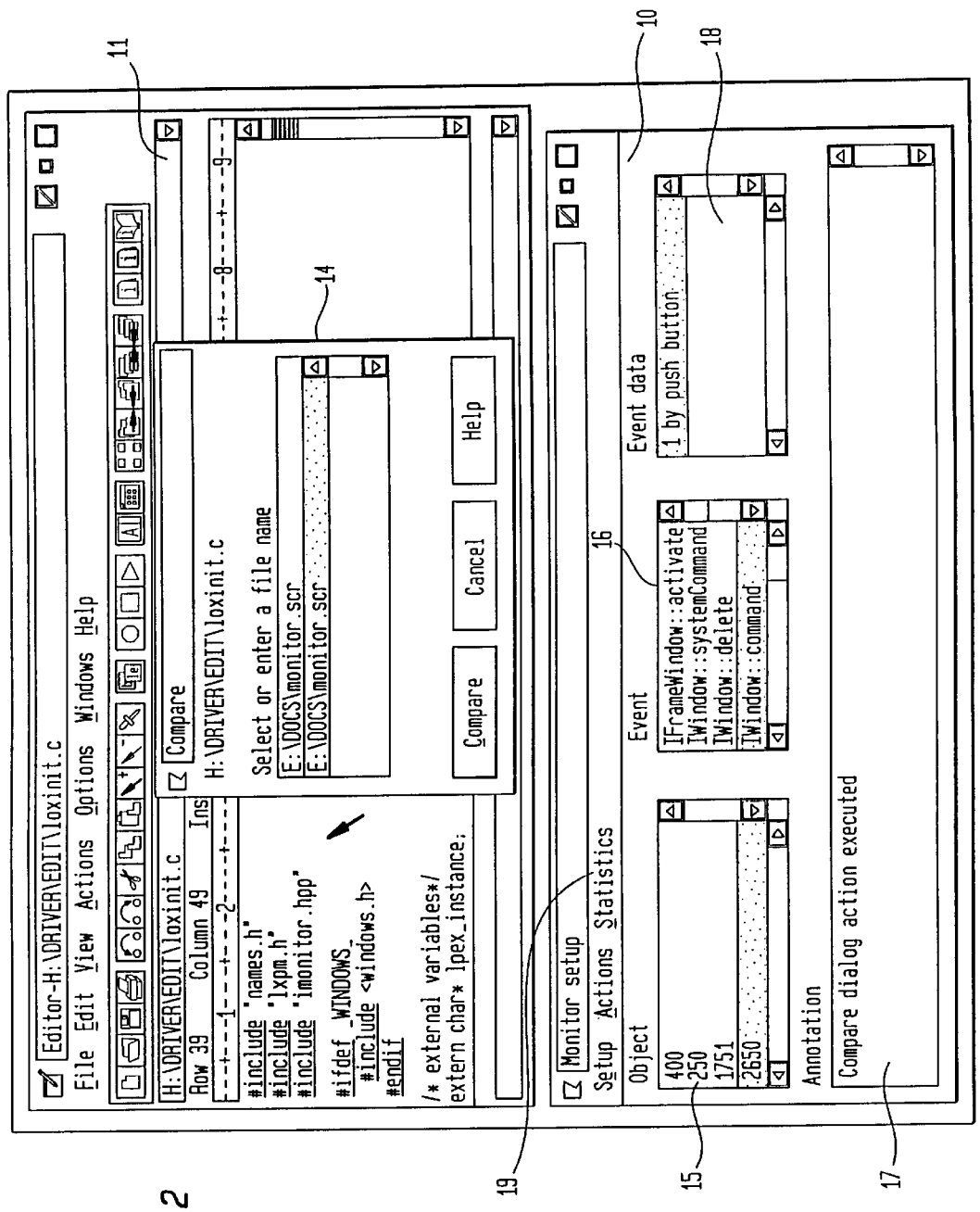
FIG. 2 is a screen display snapshot of the process described in FIG. 1.

FIG. 2 is a screen snapshot of the process of creating a monitor input file as had been broadly illustrated and described in relation to FIG. 1. FIG. 2 illustrates aspects of an application program that has been created by the use of functions and capabilities of the VisualAge product, and also a setup tool. The screen display of FIG. 2 consists of application 11 running concurrently on a computer system with setup tool 10. As an illustrative function, a compare dialog 14 has been shown initiated in application 11 resulting from being pulled down from the "Actions" menu item in the menu bar of application 11 as shown. Each of application 11 and setup tool 10 are considered to be separately running programs on the computer system. By means of dynamic data exchange (DDE) capabilities previously mentioned, actions and changes of state in objects in application 11 can be readily reflected in setup tool 10, as will be subsequently described.

It is understood that application 11 in FIG. 2 serves only as an illustrative example of the implementation of the invention and the creation of instrumentation for an object oriented application and is not to be construed as limiting the invention in any way. This description is intended to be generic and applicable to any object oriented program application having the appropriate characteristics as described in this specification.

As an application is being used by the developer, as generally shown by numeral 11, all object identifiers corresponding to IWindow objects within the application being changed, affected by or interacted with in some way by the developer/user, are logged in object display area 15 of the screen of setup tool 10. A number of such object identifiers are shown in FIG. 2 as illustrative examples of objects with which the user has interacted. Notification events corresponding to the particular objects identified in object display area 15, are logged in the event display area 16 of the screen of setup tool 10. Each object identifier in object display area 15 may have a number of notification events displayed in event area 16. The correlation of objects and events reflected in setup tool 10 resulting from their change of state or use by the developer/user of application 11 results from the DDE functions and capabilities of the application as is well known in the art.

Sets of object identifiers listed in object display area 15 and notification events listed in event display area 16 for which the user/developer requires feedback from the subsequent use of the application by a customer/end-user, can then be individually selected by the user/developer. In FIG. 2, one such object identifier and notification event have been selected by the user/developer as shown by the highlighted or enhanced object identifier 2650 and event IWindow-::Command. The selected sets of object identifiers and notification events form part of the resulting monitor input file 13 as described with reference to FIG. 1. In addition, as shown in FIG. 2, the user/developer may also enter comments or data in annotation area 17 of the screen display within setup tool 10. In the example in FIG. 2, a reference is made to the compare dialog which has been initiated in application 11 as previously mentioned. This data will be subsequently recorded in monitor output file 13 along with the object identifier/notification event when and if that event occurs when the end user subsequently uses the application. Of course, any comment that the developer considers meaningful could be included in annotation area 17. Display area 18 provides for any associated event data generated by the event and could be included in monitor input file 13 as part of the corresponding notification event. The example shown for the highlighted event is that it was initiated by a push button or in other words the mouse was clicked on the "compare" button shown in compare dialog 14.

As a further feature that can be incorporated into the monitor input file, designated statistics from the eventual use of the application can be gathered from the application in the output when it is run by having appropriate instructions included in the input file. This can be initiated by the user/developer in the setup phase from the pull down menu resulting from clicking on "statistics" button 19 in setup tool 10. Any number of statistics of end user activity that the developer may be interested in could be collected including total running time of the application, number of times an object is invoked, etc.

An example of a monitor input file 13 resulting from the above described use of the setup program tool which can be used as Dart of an application to provide desired feedback is as follows:

/* sample monitor input file */
ID: 400
EVENT: IWindow::command 4162 by menu
ANNOTATION: Compare dialog invoked
EVENT: IWindow::command 4091 by menu
ANNOTATION: Filter dialog invoked
STATS: INVOCATIONS
ID: 250
EVENT: IWindow::systemCommand 32772 by push button
ANNOTATION: Filter dialog cancelled
ID: 2650
EVENT: IWindow::command 1 by push button
ANNOTATION: Compare dialog action executed
STATS: INVOCATIONS
GENERAL_STATS: APP_TIME
OUTPUT: F:\TEST\MONITOR.OUT The above monitor input file includes the unique identifiers of three objects of an application, namely 400, 250 and 2650. These, of course, have been selected during use of the setup tool by the user/developer as previously described in relation to FIG. 2. As can be seen from the file, object 400 has two events associated with it in which the IWindow objects provide notification to an Observer class, or its Monitor sub-class, if the designated event occurs when the application is subsequently run. These occurrences will be reflected in the subsequent monitor output file. A description or annotation of each event in the above file as indicated in the line in the sample file after the event will also be included in the monitor output file. For objects 250 and 2650, a similar indication of IWindow object will provide notification of the described event to the Monitor object when the events of these objects occurs. It is apparent from the above file that each of the events included in the monitor input file includes the corresponding event data.

Both objects 400 and 2650 will result in statistical activities which had been selected by the developer being provided by the objects STATS: INVOCATIONS. An indication of the running time of the application wind be provided in the monitor output file as a result of the statement GENERAL_STATS: APP_TIME as part of the above sample monitor input file. This monitor input file 13, which is merely an example resulting from the process of FIG. 1, and as further described with reference to FIG. 2, is then provided as part of application 11 to the customer/end-user. It is apparent that object 2650 and the associated following event, event data and annotation are the same details as contained in display areas 15, 16, 18 and 17 respectively within setup tool 10 in FIG. 2.

Figure 3:
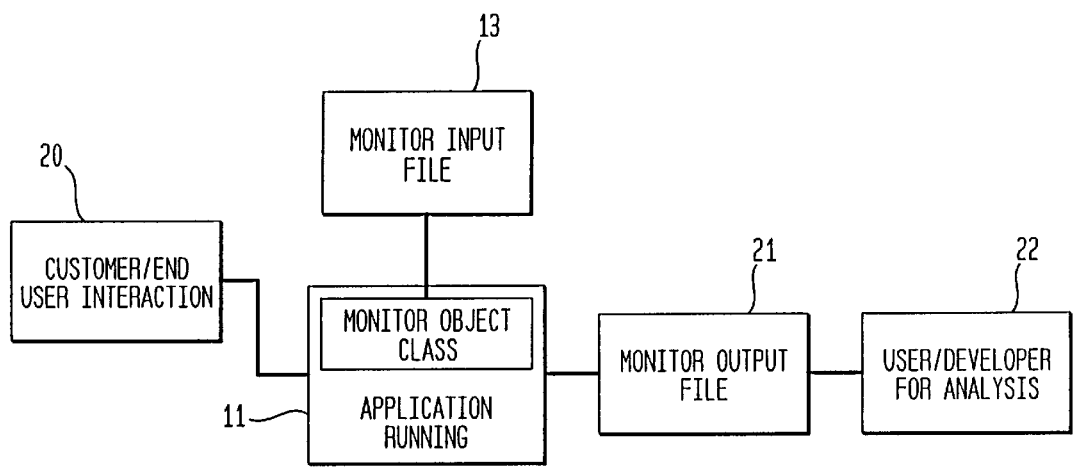
FIG. 3 is an illustration of using the monitor input file.

With reference to the illustration in FIG. 3, as the customer/end-user 20 makes use of application 11 and executes and runs application 11 on a computer system, monitor output file 21 is created by interaction or the monitor input file 13 and application 11. Monitor output file 21 can ultimately be used by the developer for analysis and possible product enhancement as generally indicated by numeral 22.

A further more detailed description of the process generally illustrated in FIG. 3 will now be provided. By means of data link library capabilities inherent in the application, application 11 creates an instance of the IObserver subclass, referred to as a Monitor object, at startup time of application 11. After reading in monitor input file 13, the Monitor object waits to be notified by an IWindow object acting as a notifier object. As a customer/end-user runs application 11 with the included monitor input file 13, a Monitor object of application 11, reads in and processes monitor input file 13. With respect to the above described sample monitor input file, when IWindow objects are created from the interaction of customer/end-user 20 with application 11, a notification event associated with the object is sent to the Monitor object. The Monitor object checks the unique identifier of the notifying IWindow object against its list of object identifiers from the monitor input file 13, which resulted from the setup phase as previously described for FIG. 2, and if found, begins to accept notifications from that notifying object. When a subsequent notification from the IWindow object comes in, the Monitor object checks if the notification is to be tracked, that is, it checks whether it corresponds to one of the sets of selected objects and events included in monitor input file 13. If it does exist, the Monitor object writes predefined data including any annotations from monitor input file 13, as previously described in relation to FIG. 2, to monitor output file 21. Monitor output file 21 is created and can be saved on a disk, for example, and subsequently provided in an appropriate manner as is well known in the art, as shown at 22, to the developer for analysis of the user interaction with the application. When application 11 is finally terminated by the customer/end-user 20, the Monitor object is deleted.

As had been previously described with reference to the sample monitor input file and FIG. 2, the Monitor object can also gather statistical data pertaining to the use of the application by the customer/end-user, such as the length of time the application is used or the number of times an object is invoked during a particular application run. Since the events are written into monitor output file 21 in chronological order, a chronology of the functioning of application 11 in terms of its events is made available in monitor output file 22.

The above description provides aspects and illustrative examples and embodiments of the invention as it pertains to run-time instrumentation of object oriented applications for providing application-related information as to end user interactions with the applications. As is readily apparent to one skilled in the art, the inventive method and software described are operable on similar computer platforms and operating systems as for the VisualAge C++ family of products including personal computers and AS/400 host system platforms with Windows, OS/2 or OS/400 operating systems.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A computer implemented method for providing run-time instrumentation for an object oriented programmed computer application, said application having object identifiers and supports dynamic data exchange, said method comprising the steps of:

concurrently running said application on a computer system with a set-up program which also supports dynamic data exchange;

logging and displaying object identifiers in the set-up program resulting from user interaction with objects in said application;

selecting object identifiers from those logged and displayed;

creating a monitor input file based on the said selected object identifiers; and using said monitor input file to provide run-time instrumentation for said application when said application and monitor input file are subsequently used on a computer system.

2. The computer implemented method according to claim 1 wherein said object identifiers are persistent and unique identifiers of notifier objects.

3. The computer implemented method according to claim 1 wherein said application provides notification events resulting from user interaction with objects in said application, said notification events correspond to said object identifiers in said application;

said step of logging and displaying object identifiers includes logging and displaying said notification events;

said step of selecting object identifiers includes selecting notification events from those logged and displayed; and said step of creating a monitor input file includes creating said file based on said selected object identifiers and said selected notification events.

4. The computer implemented method according to claim 1 wherein said application further includes a monitor object class whereby the monitor input file in conjunction with an instance of an object of the monitor object class provides an output from the computer system containing a record of the interaction of an end user with said application.

5. A computer implemented method for providing an output containing details of user interaction with an object oriented programmed computer application running on a computer system in which said programmed application includes object identifiers, a monitor class of objects and a monitor input file which includes the identifiers of objects selected from those objects created in said application, said method comprising the steps of:

executing said application on the computer system which involves interaction of an end-user with said application;

creating an instance of a monitor object by the execution of said application;

processing the monitor input file in the computer system by said instance of a monitor object; and providing an output from the computer system representing details of user interaction with said application.

6. The computer implemented method according to claim 5 wherein said object identifiers are persistent and unique identifiers of notifier objects.

7. The computer implemented method according to claim 5 in which said output results from the activation of those objects of the application which correspond to the objects identified in the monitor input file and initiated by the end user during execution of said application.

8. The computer implemented method according to claim 5 in which said monitor input file further includes notification events associated with said selected object identifiers included in the monitor input file, said method includes the further steps of:

sending a notification event to said instance of said monitor object when an object in said application occurs;

checking the identity of the object against a list of object identifiers contained in the monitor input file when the notification event is received by said instance of said monitor object;

determining if the identity of the object corresponding to the notification event exists in the monitor input file; and causing said output to be created reflecting said object identity and notification event if the identity of the object exists in the monitor input file and representing details of user interaction with said application.

9. The computer implemented method according to claim 5 wherein said monitor input file includes annotations of actions resulting from the interaction of an end user with objects in said application, and said annotations representing details of interaction of the user with said application are reflected in the output.

10. The computer implemented method according to claim 5 wherein the monitor input file includes event data pertaining to use of said application, and said event data representing details of interaction of the user with said application are reflected in the output.

11. The computer implemented method according to claim 5 wherein the monitor input file includes instructions for capturing statistical data pertaining to the use of the application by an end user and said statistical data representing details of interaction of the user with the application are reflected in the output.

12. A computer program product comprising:

a computer usable medium having computer readable program code means therein for providing details of user interaction with an object oriented programmed computer application running on a computer system in which said programmed application includes object identifiers, a monitor class of objects and a monitor input file which includes object identifiers selected from those object identifiers contained in said application, the computer readable program code means in said computer program product comprising:

computer readable program code means for causing the computer to execute said application and which involves interaction of an end-user with said application;

computer readable program code means for causing the computer to create an instance of a monitor object by the execution of said application;

computer readable program code means for causing the computer to process the monitor input file by said instance of a monitor object; and computer readable program code means for causing the computer to provide an output representing details of user interaction with said application.

13. The computer program product according to claim 12 wherein said object identifiers are persistent and unique identifiers of notifier objects.

14. The computer program product according to claim 12 in which said computer readable program code means for causing the computer to provide an output representing details of user interaction with said application results from the activation of those objects of said application initiated by the end user during execution of said application which correspond to the objects selected in the monitor input file.

15. The computer program product according to claim 12 in which said monitor input file further includes notification events associated with said selected object identifiers included in the monitor input file, said computer program product further including:

computer readable program code means for causing the computer to send a notification event to said instance of said monitor object when an object in said application occurs;

computer readable program code means for causing the computer to check the identity of the object against a list of object identifiers contained in the monitor input file when the notification event is received by said instance of said monitor object;

computer readable program code means for causing the computer to determine if the identity of the object corresponding to the notification event exists in the monitor input file; and computer readable program code means for causing the computer to provide said output to be created reflecting said object identity and notification event if the identity of the object exists in the monitor input file and representing details of user interaction with said application.

\* \* \* \* \*

UNITED STATES PATENT AND TRADEMARK OFFICE
CERTIFICATE OF CORRECTION

PATENT NO. : 6,126,330
DATED : October 3, 2000
INVENTOR(S) : Christine N. Knight It is certified that error appears in the above-identified patent and that said Letters Patent is hereby corrected as shown below:

<u>Title page,</u>
After Section [22], insert the following:

-- [30] Foreign Application Priority Data
Oct. 29, 1997 [CA] Canada.........2219557 --

<u>Column 3,</u>
Line 18: "time" should read -- run-time --

<u>Column 7,</u>
Line 12: "Dart" should read -- part --

Signed and Sealed this

Eleventh Day of September, 2001

Attest:

*Nicholas P. Godici*

NICHOLAS P. GODICI
*Attesting Officer*    *Acting Director of the United States Patent and Trademark Office*